(12) United States Patent
Hodges

(10) Patent No.: US 6,182,514 B1
(45) Date of Patent: Feb. 6, 2001

(54) PRESSURE SENSOR FOR SEALED CONTAINERS

(75) Inventor: Franklin R. Hodges, Loudon, TN (US)

(73) Assignee: UT-Battelle, LLC, Oak Ridge, TN (US)

( * ) Notice: Under 35 U.S.C. 154(b), the term of this patent shall be extended for 0 days.

(21) Appl. No.: 09/353,908

(22) Filed: Jul. 15, 1999

(51) Int. Cl.[7] .................. G01L 9/10; G01L 7/06; G01D 21/00
(52) U.S. Cl. .......... 73/722; 73/729.1; 73/866.5; 73/728
(58) Field of Search .............. 73/722, 728, 703, 73/866.5, 729.1

(56) References Cited

U.S. PATENT DOCUMENTS 3,545,267 * 12/1970 Reid et al. .
3,841,158 * 10/1974 Hunter .................. 73/407 R
3,946,175 * 3/1976 Sitabkhan .............. 200/83 L
4,206,761 * 6/1980 Cosman ................ 128/660
4,665,747 * 5/1987 Muscatell ............... 73/386

\* cited by examiner

*Primary Examiner*—Benjamin R. Fuller
*Assistant Examiner*—Abdullahi Aw-Musse
(74) *Attorney, Agent, or Firm*—Quarles & Brady LLP

(57) ABSTRACT

A magnetic pressure sensor for sensing a pressure change inside a sealed container. The sensor includes a sealed deformable vessel having a first end attachable to an interior surface of the sealed container, and a second end. A magnet mounted to the vessel second end defining a distance away from the container surface provides an externally detectable magnetic field. A pressure change inside the sealed container causes deformation of the vessel changing the distance of the magnet away from the container surface, and thus the detectable intensity of the magnetic field.

28 Claims, 2 Drawing Sheets

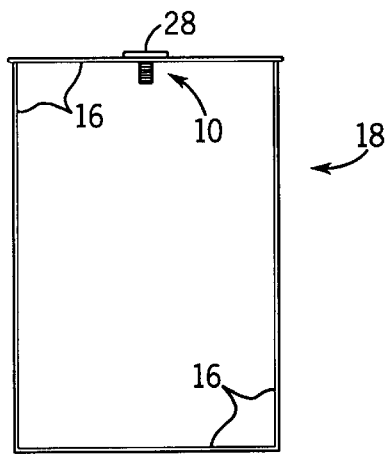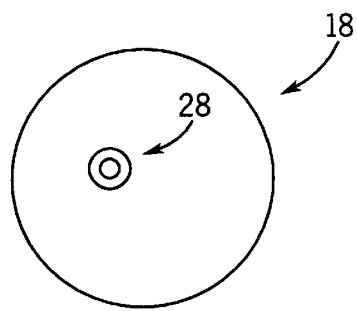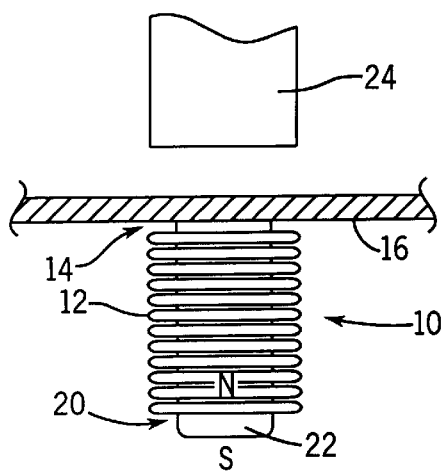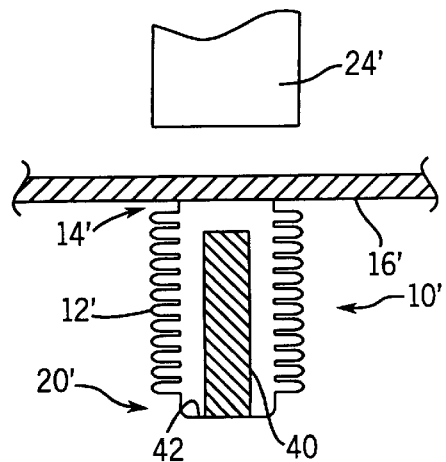

PRESSURE SENSOR FOR SEALED CONTAINERS

STATEMENT REGARDING FEDERALLY SPONSORED RESEARCH

This invention was made with government support under contracts DE-AC05-84OR21400, awarded by the United States Department of Energy to Lockheed Martin Energy Research Corporation, and the United States Government has certain rights in this invention.

CROSS REFERENCES TO RELATED APPLICATIONS

Not Applicable

BACKGROUND OF THE INVENTION

The field of invention is pressure sensors, more particularly pressure sensors for determining pressure changes in a sealed container.

Many incidents of fire, explosion, and ground contamination have occurred at various facilities over the years due to container rupture because of over pressurization. Containers, such as drums, frequently contain hazardous liquid wastes, with the result that the rupture causes the waste material to contaminate the surrounding environment. Drums are often classified into two types, open head and tight head. An open head drum has an open top which is sealed with a lid. A tight head drum has a closed top with bung holes for draining and venting. When sealed, the tight head bung holes are sealed with bung plugs.

Over pressurization may occur as a result of climatic changes causing the drum to be over pressurized, such as may occur should the drum be exposed to strong sunlight. Volatile wastes stored in an area subject to high temperatures may result in pressure build up sometimes being sufficient to cause the drum to burst or rupture. More often, the over pressurized drum ruptures during handling by personnel unaware of the elevated drum pressure.

The increase of gases and vapors in a drum may sometimes be identified due to bulging or deformation prior to the build up reaching a level sufficient to rupture the drum or cause a violent release of material. In many cases, the drums are over packed so that visual signs of over pressurization are not evident. Invasive techniques of determining the internal pressure of a sealed drum is time consuming, may result in the release of toxic material into the atmosphere, and is therefore, often limited to drums exhibiting some bulging.

In many incidents, however, drums become pressurized to the extent that visible deformation has not occurred but personnel transporting and storing drums are unaware of pressurization. Those skilled in the art will recognize a need for a non-intrusive apparatus that will provide an indication of a pressure change inside a sealed container.

BRIEF SUMMARY OF THE INVENTION

The present invention provides a pressure sensor suitable for detecting a pressure change inside a sealed container. The sensor includes a sealed deformable vessel disposed inside a sealed container, and a detector disposed outside of the sealed container. A change in pressure inside of the container deforms the vessel, and the detector detects said vessel deformation.

In one aspect of the invention the sensor includes a sealed deformable vessel having a first end attachable to an interior surface of the sealed container, and a second end. A magnet mounted to the vessel second end defining a distance away from the container surface provides an externally detectable magnetic field. A pressure change inside the sealed container causes deformation of the vessel changing the distance of the magnet away from the container surface, and thus the detectable intensity of the magnetic field. A location indicator on an exterior surface of the sealed container corresponds to the location of the vessel inside the container.

A general object of the present invention is to provide a non-intrusive pressure sensor for sensing a pressure change inside a sealed container. This objective is accomplished by providing a pressure sensor with a deformable vessel which is mounted inside the sealed container which deforms in response to a pressure change inside the container.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is a side view of a magnetic pressure sensor incorporating the present invention mounted to a sealed container;

FIG. 2 is a side view of the magnetic pressure sensor of FIG. 1;

FIG. 3 is a top view of the container of FIG. 1;

FIG. 6 is a sectional side view of second embodiment of the invention using an ultrasonic detector.

DETAILED DESCRIPTION OF THE PREFERRED EMBODIMENTS

Figure 4:
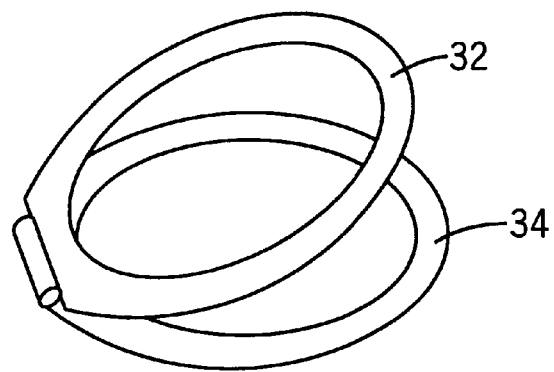
FIG. 4 is a perspective view of an alternate detector.

Referring to FIGS. 1 and 2, a pressure sensor 10 incorporating the present invention includes a sealed deformable vessel 12 having a proximal end 14 mounted to an interior surface 16 of a sealed container 18, such as a drum, and a distal end 20. The vessel proximal end 14 is attached to an interior container surface 16, such as a drum wall, lid, and bung plug, using methods known in the art, such as epoxy adhesives or the like. Advantageously, attaching the vessel to the bung plug allows the vessel to be easily inserted into the container at the time the container is sealed A magnet 22 mounted to the vessel distal end 20, using methods known in the art, provides a magnetic field having an intensity detectable from outside the container 18. A change in pressure inside the sealed container 18 causes the vessel 12 to deform, changing the intensity of the magnetic field detectable from the exterior of the container 18.

Looking particularly at FIG. 2, the vessel 12 is an elongated, air tight convoluted bellows which deforms axially in response to a change in air pressure surrounding the vessel 12. The vessel 12 is formed from a sealable deformable material, such as metal, plastic, or the like. The material selected for forming the vessel 12 depends upon the intended use of the pressure sensor 10. For example, a pressure sensor expected to encounter a large pressure change may be formed of a metal, while a pressure sensor requiring greater sensitivity may be formed from a plastic material. In addition the container contents may also dictate the vessel material, for example, a highly corrosive container contents may preclude the use of a material subject to corrosion.

Although, a vessel 12 having a convoluted bellows shape is preferred, any shaped air tight vessel which has an end defining a distance away from the container interior surface 16 may be used. Advantageously, the convoluted bellows shape provides a vessel 12 with a determinable axial deformation in response to specific pressure changes inside the sealed container 18. The determinable axial deformation may be correlated with the detectable intensity of the magnetic field to determine the pressure inside the container 18.

The pressure inside the sealed vessel 12 is preferably no more than the surrounding atmospheric pressure prior to sealing the container 18. Most preferably, the pressure inside the sealed vessel 12 is less than the surrounding atmospheric pressure to provide a more sensitive sensor 10 to pressure increases inside the sealed container 18.

The magnet 22 is mounted to the vessel distal end 20, and provides the magnetic field having an intensity detectable from the container exterior by a detector 24. Preferably, the magnet is a permanent magnet to provide a sensor having a long useful life. Most preferably, the magnet 22 is a permanent steady state disc type magnet formed from a rare earth material, such as neodymium iron boron. Although a permanent magnet is preferred to provide a self sufficient pressure sensor having an extended useful life, other magnets, such as nonpermanent magnets and electromagnets, may be used with departing from the scope of the present invention. of course, the use of a magnet other than a permanent magnet can reduce the useful life or self sufficiency of the pressure sensor.

The magnet 22 is mounted inside the vessel 12 using methods known in the art, such as adhesives, press fit, or the like. Although mounting the magnet 22 inside the vessel 12 is preferred, the magnet 22 may also be mounted to an exterior surface of the vessel 12 without departing from the scope of the present invention.

The detector 24 detects the vessel deformation by determining a change in the intensity of the magnetic field from the magnet 22. Preferably, the detector 24 is a magnetic field intensity sensor, such as a Gaussmeter Teslameter, which can measure the change in magnetic field intensity. However, other detectors may be used such as a magnetic switch mounted proximal the deformable vessel. The switch is closed when the vessel deforms sufficiently to increase the magnetic field intensity above the magnetic switch threshold. The closed switch is electrically connected to an alarm system, such as a light mounted to the container, an alarm control panel monitoring a plurality of containers, and the like.

Referring to FIG. 3, a location indicator 28, such as a decal adhesively mounted on the container exterior, indicates the location of the sensor 10 inside the sealed container 18. Knowing the location of the sensor 10 inside the container 18 allows a user to consistently measure the magnetic field intensity from the same location, thus providing consistent readings.

In one embodiment of the present invention, the location indicator 28 also provides information to a user concerning the container contents and other pertinent data, such as temperature and pressure at the time the container 18 was sealed, and other pertinent information.

The information can be printed on the decal or stored on a memory device indicating the location of the vessel 12. Preferably, the memory device is a rugged, high capacity, electronically erasable, programmable read only module (EEPROM), such as a MiniButton™, available from MacSema, Inc. Bend, Oreg. Advantageously, the EEPROM is capable of lasting the life of the sealed container to support logistics requirements associated with life-cycle management of the container including transportation and long term storage.

In use, the pressure sensor 10 is attached to an container interior surface 16, such as the container lid, and then the container 18 is sealed. Initially, the internal pressure of the container 18 is equal to the external atmospheric pressure, for example at sea level the atmospheric pressure is approximately 14.7 psia. The vessel 12 maintains the magnet 22 mounted to the pressure vessel distal end 20 spaced a distance from the container interior surface 16 providing a detectable magnetic field from the exterior of the container 18.

When the pressure increases in the sealed container 18, such as caused by external heating due to exposure to sunlight, internally generated gas, or the like, the vessel 12 collapses due the pressure difference between the pressure inside the vessel 12 and the pressure inside the sealed container 18. As the vessel 12 collapses, the magnet 22 moves closer to the container interior surface 16 increasing the intensity of the detectable magnetic field from the exterior of the sealed container 18. A magnetic field intensity sensor disposed adjacent the location indicator 28 senses the magnetic field to determine whether the intensity has changed.

Figure 5:
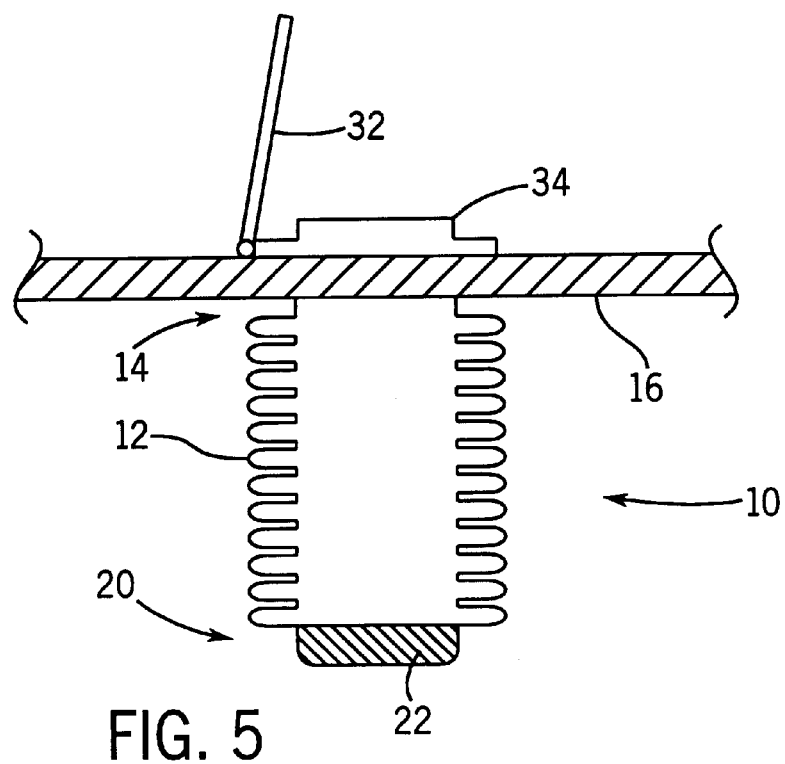
FIG. 5 is a sectional view of the present invention using the detector of FIG. 4.

In an alternative embodiment, shown in FIGS. 4–5, the detector 24 can be a magnet 32 hingedly connected to a base 34 which is mounted to the container exterior proximal the vessel. The detector magnet 32 is positioned with respect to the sealed vessel magnet 22 such that like poles are facing each other. As the vessel 12 deforms, the like poles of the magnets 22, 32 repel each other, thus raising the detector magnet 32 to indicate a pressure change inside the sealed container 18. Advantageously, the detector also serves as a location indicator.

As shown in FIG. 5, the raised magnet 32 can act as an antenna which reflects radio waves from a transmitter (not shown). The raised antenna reflects the radio waves better than an unraised antenna, thus a receiver (not shown) can detect a change in the reflected radio waves indicating a pressure change inside the sealed container 18. Advantageously, a user can monitor a plurality of sealed containers with a single transmitter and receiver.

In still another embodiment of the present invention, the vessel deformation is detected using ultrasonics. As shown in FIG. 6, a sealed deformable vessel 12', such as described above, has a probe 40 mounted on an interior surface 42 of the vessel distal end 20', and extends toward the container surface 16'. When the vessel has deformed a predetermined amount, the probe 40 exerts a force on the container surface 16' which alters the ultrasonic wave reflection characteristics of the container wall to create a discontinuity.

An ultrasonic detector 24', suitable for use as a flaw detector, such as a Krautkramer Model USN 52L, available from Krautkramer Branson, Lewiston, Pa., and a PosiTector 100, available from DeFelsko Corporation, Ogdensburg, N.Y., transmits and receives ultrasonic waves to detect discontinuities in container walls. A large discontinuity in the container wall proximal the pressure sensor indicates that the probe is exerting a force on the container surface 16', and that the pressure has increased inside the container.

While there has been shown and described what are at present considered the preferred embodiment of the invention, it will be obvious to those skilled in the art that various changes and modifications can be made therein without departing from the scope of the invention defined by the appended claims.

I claim:

1. A pressure sensor suitable for detecting a pressure change inside a container, said sensor comprising:
    a sealed deformable vessel disposed inside the container;
    a deformation indicator mounted to said vessel which provides an indication of vessel deformation which is detectable external to the container; and
    a detector disposed outside of the container, wherein a change in pressure inside the container deforms said vessel, and said detector detects the indication provided by said deformation indicator of the vessel deformation, wherein said deformation indicator is a magnet mounted to said vessel located at a distance away from an exterior surface of said container, and wherein a pressure change in said container causes deformation of said vessel changing said distance of said magnet away from said container surface.

2. The pressure sensor as in claim 1, wherein said deformable vessel has a convoluted bellows shape.

3. The pressure sensor as in claim 1, wherein said deformable vessel is formed from metal.

4. The magnetic pressure sensor as in claim 1, wherein said magnet is a permanent magnet.

5. The pressure sensor as in claim 1, wherein said magnet is a steady state rare earth magnet.

6. The pressure sensor as in claim 1, wherein said detector is a Teslameter.

7. The pressure sensor as in claim 1, wherein said detector is a magnetic switch.

8. The pressure sensor as in claim 7, further including an alarm device electrically connected to said switch.

9. The pressure sensor as in claim 1, wherein said detector is a second magnet.

10. The pressure sensor as in claim 9, further including an antenna disposed within the magnetic field of said second magnet, wherein said antenna rises with said second magnet.

11. The pressure sensor as in claim 10, further including a remote radio frequency transmitter and receiver which transmits radio waves toward said raised antenna and receives radio waves from said antenna.

12. The pressure sensor as in claim 1, further including a probe attached to said vessel, wherein said probe contacts an interior surface of said container when said vessel deforms.

13. The pressure sensor as in claim 12, wherein said detector determines whether the vessel is deformed by ultrasonically determining whether said probe is in contact with said container inner surface.

14. A pressure sensor suitable for detecting a pressure change inside a container, said sensor comprising:
    a sealed deformable vessel disposed inside the container;
    a deformation indicator mounted to said vessel which provides an indication of vessel deformation which is detectable external to the container;
    a detector disposed outside of the container, wherein a change in pressure inside the container deforms said vessel, and said detector detects the indication provided by said deformation indicator of the vessel deformation; and
    a location indicator disposed on the outside of said container proximal said vessel for indicating the approximate location of said vessel inside said container.

15. The pressure sensor as in claim 14, wherein said location indicator is a memory device containing information concerning contents of said container.

16. The pressure sensor as in claim 15, wherein said information includes atmospheric temperature and pressure when said container is sealed.

17. A magnetic pressure sensor comprising:
    a sealed deformable vessel having a first end attachable to an interior surface of a container, and a second end which moves when said vessels deforms due to a pressure change in said vessel; and
    a magnet having, a magnetic field detectable from outside of the container, said magnet being mounted to said vessel second end located at a distance away from said container surface, wherein a pressure change in said container causes deformation of said vessel changing said distance of said magnet away from said container surface and the intensity of the magnetic field detectable from outside of the container.

18. The magnetic pressure sensor as in claim 17, wherein said deformable vessel has a convoluted bellows shape.

19. The magnetic pressure sensor as in claim 17, wherein said deformable vessel is formed from metal.

20. The magnetic pressure sensor as in claim 17, wherein said magnet is a permanent magnet.

21. The magnetic pressure sensor as in claim 17, wherein said magnet is a steady state rare earth magnet.

22. The magnetic pressure sensor as in claim 17, further including a detector disposed within the magnetic field of said magnet for detecting a change in the magnetic field intensity caused by said vessel deformation.

23. The magnetic pressure sensor as in claim 22, wherein said detector is a Teslameter.

24. The magnetic pressure sensor as in claim 22, wherein said detector is a magnetic switch.

25. The magnetic pressure sensor as in claim 24, further including an alarm device electrically connected to said switch.

26. The magnetic pressure sensor as in claim 22, wherein said detector is a second magnet which reacts to a change in the magnetic field intensity of said magnet mounted to said vessel second end.

27. The magnetic pressure sensor as in claim 26, further including an antenna disposed within the magnetic field of said second antenna, wherein said antenna rises with said second magnet.

28. The pressure sensor as in claim 27, further including a remote radio frequency transmitter and receiver which transmits radio waves toward said raised antenna and receives radio waves from said raised antenna.

* * * * *